(12) United States Patent
Rusconi et al.

(10) Patent No.: US 10,473,250 B2
(45) Date of Patent: Nov. 12, 2019

(54) QUICK CONNECTOR

(71) Applicant: MANULI HYDRAULICS ITALIA S.R.L., Milan (IT)

(72) Inventors: Giuseppe Rusconi, Rivolta d'Adda (IT); Paolo Seghi, Milan (IT)

(73) Assignee: MANULI HYDRAULICS ITALIA S.R.L., Milan (IT)

(*) Notice: Subject to any disclaimer, the term of this patent is extended or adjusted under 35 U.S.C. 154(b) by 241 days.

(21) Appl. No.: 15/527,275

(22) PCT Filed: Nov. 17, 2014

(86) PCT No.: PCT/IB2014/066096
§ 371 (c)(1),
(2) Date: May 16, 2017

(87) PCT Pub. No.: WO2016/079563
PCT Pub. Date: May 26, 2016

(65) Prior Publication Data
US 2017/0363239 A1    Dec. 21, 2017

(51) Int. Cl.
*F16L 37/23* (2006.01)
(52) U.S. Cl.
CPC .......... *F16L 37/23* (2013.01); *F16L 2201/10* (2013.01); *F16L 2201/20* (2013.01)
(58) Field of Classification Search
CPC .... F16L 37/23; F16L 2201/10; F16L 2201/20
See application file for complete search history.

(56) References Cited

U.S. PATENT DOCUMENTS

| 3,140,072 | A | * | 7/1964 | Scinto, Jr. | ............... F16L 37/23 285/277 |
| 3,346,276 | A | | 10/1967 | Snyder, Jr. | |
| 3,359,015 | A | | 12/1967 | Zahuranec | |
| 3,420,497 | A | * | 1/1969 | Wilcox | ................... F16L 37/23 285/277 |

(Continued)

FOREIGN PATENT DOCUMENTS

| DE | 29708412 U1 | 7/1997 |
| WO | 9412826 A1 | 6/1994 |
| WO | 2014108760 A1 | 7/2014 |

OTHER PUBLICATIONS

International Search Report and Written Opinion of the International Searching Authority Application No. PCT/IB2014/066096 Completed: Jul. 1, 2015; dated Jul. 13, 2015 10 pages.

*Primary Examiner* — David Bochna
(74) *Attorney, Agent, or Firm* — Whitmyer IP Group LLC

(57) ABSTRACT

A quick connector is described to removably connect hydraulic equipment operating in underground coal mines, wherein two tubular bodies are coupled to each other such as to define one individual fluid passage, a tubular element is movable between a closed position and an open position in which it either blocks or allows a relative axial movement between the tubular bodies, respectively, and a safety member slides on the tubular element between at least one safety position and a freedom position, wherein it either blocks or allows the tubular element to move to the open position, respectively.

20 Claims, 3 Drawing Sheets

(56) References Cited

U.S. PATENT DOCUMENTS

| | | | | |
|---|---|---|---|---|
| 4,776,614 A * | 10/1988 | Marrison | ............... | F16L 37/23 285/87 |
| 5,390,963 A * | 2/1995 | Namekawa | ............ | F16L 37/23 285/86 |
| 2003/0042734 A1* | 3/2003 | Kuwabara | ............... | F16L 37/23 285/81 |
| 2007/0235092 A1* | 10/2007 | Danielson | ............... | F16L 37/23 137/614 |
| 2014/0103637 A1* | 4/2014 | Lu | .......................... | F16L 37/23 285/33 |
| 2016/0138744 A1* | 5/2016 | Polgati | ................... | F16L 37/23 285/276 |

* cited by examiner

QUICK CONNECTOR

TECHNICAL FIELD

This invention relates to a quick connector for hydraulic connections.

BACKGROUND OF THE INVENTION

Specifically, though not exclusively, this invention can be advantageously applied to the removable connection of hydraulic equipment operating in critical working conditions, for example in environment with high levels of humidity and dust, such as in the mining sector, particularly underground coal mines.

Reference is particularly made to a first type of connector provided in accordance with the preamble of claim 1. This type of connector is known from patent publication No. WO 2014/108760 A1.

It is also known, for the hydraulic connection of equipment used in underground coal mines, a second type of connector having a male body with an integrated hose-end fitting for connection to hoses, a female body for connection to a hydraulic use, and a fork that can be inserted to attach said bodies.

A drawback of known connectors is the risk of accidental detachment, which can be due, for example, to an undesired displacement of the axially movable tubular locking element (with reference to the first type of connector), to the attaching fork not being inserted or not properly inserted, to the attaching fork coming off, and to the fork being mistakenly forcibly removed with the connector under pressure (with reference to the second type of connector).

SUMMARY OF THE INVENTION

An object of the invention is to provide a connector that is capable of overcoming the above-mentioned prior art drawback.

An advantage is to provide a safety system for a quick connector for hydraulic connections against accidental detachment, particularly for a connector provided with a male part with integrated hose-end fitting for connection to hoses and a female part with a quick attachment and detachment device.

An advantage is that, by activating the safety system, any accidental detachment of the connector during operation is prevented.

An advantage is to provide a connector with a safety system against accidental detachment, which can be actuated in a simple and immediate manner.

An advantage is to provide a safety system with an immediate visual control of the connector safety level.

An advantage is to actuate the safety system by simple operations that can be manually carried out without using tools.

An advantage is to provide a constructively simple and cost-effective connector which is provided with a safety system with small overall dimensions.

An advantage is to ensure a high reliability against the accidental detachment of the connector when the safety system is actuated.

An advantage is to provide a quick connector with a safety system protected from external noxious agents entering therein, particularly dust and humidity.

These and other objects and advantages are achieved by the connector according to one or more of the claims below.

In an exemplary embodiment, a connector comprises: two tubular bodies (removably) coupled to each other, thereby defining one individual fluid passage; a (tubular) element movable between a closed position and an open position wherein it either blocks or allows the relative disconnection between said tubular bodies, respectively; and at least one safety member sliding on said (tubular) element between at least one safety position and a freedom position in which it either blocks or allows said tubular element moving to said open position, respectively.

BRIEF DESCRIPTION OF THE DRAWINGS

This invention will be better understood and carried out with reference to the annexed drawings illustrating a non-limiting embodiment thereof.

DETAILED DESCRIPTION

Figure 1:
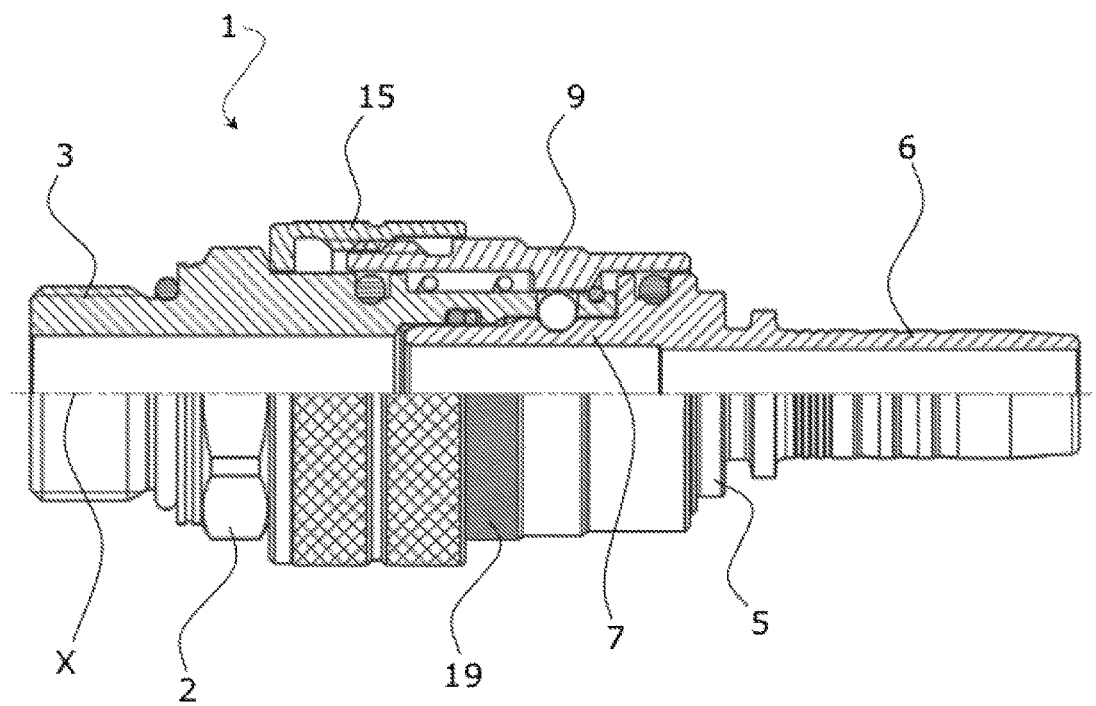
FIG. 1 is a half-sectional view of an exemplary embodiment of a quick connector according to the invention in a safety configuration in which the accidental detachment of the connector is prevented.

With reference to said figures, a quick connector for a removable hydraulic connection has been designated with 1. The connector 1 may be particularly used for providing a sealed hydraulic connection (for example, for the direct hydraulic connection) between a hose and a hydraulic use. The connector 1 may enable the hose being arranged in a sealingly connected configuration to carry out a rotational movement about the longitudinal axis thereof.

The connector 1 comprises a first tubular (female) body 2 defining a fluid passage therein. The first body 2 may have, as in this case, a first end portion 3 for connection to a hydraulic use (known per se and not illustrated herein). This connection may comprise, for example, a screw connection (such as in the example illustrated herein) or the like.

The first body 2 may be entirely of the free flowing type, as in this specific example, whereby the first body 2 internally defines a fluid passage not provided with intercepting members or other types of valve elements.

The first body 2 may comprise, for example, a (tubular) female portion 4 having a first inner surface (for example, a surface of revolution, particularly cylindrical), and a first outer surface (for example, a surface of revolution, particularly cylindrical).

The connector 1 comprises a second (male) body 5 being removably coupled to the first body 2. The second body 5 defines a fluid passage therein, which is intended to be in communication (in this case, free and co-axial) with the fluid passage defined by the first body 2. The second body 5 may be tubular. The second body 5 may have a second end portion 6 (hose-end fitting) for connection to a hydraulic conveyor tube, for example for the connection to a hose. The second body 5 may have a (tubular) male portion 7 inserted within the female portion 4 according to a coupling axis X.

The female portion 4 may have, as in this specific case, a housing for accommodating a removable locking device 8, which is arranged to lock a relative axial displacement between the first body 2 and second body 5. The locking device 8 may comprise, for example, revolving elements, particularly rolling elements (balls or rollers). The housing may comprise, for example, a plurality of ball housings that may be particularly arranged along a circumference about the coupling axis X. Each ball housing may have an inner aperture opening to the first inner surface of the first body 2 and an outer aperture opening to the first outer surface of the first body 2. It is possible to provide, instead of a plurality of ball housings separated from each other, at least one housing (not illustrated) which is capable of receiving alone a plurality of rolling elements (balls or rollers).

The locking device 8 may comprise, as in the example described herein, a plurality of locking elements arranged in circle. Specifically, the locking device 8 comprise a plurality of locking balls which can be each arranged in a respective ball housing.

Each locking element (ball) may have, as in this case, a greater diameter than a dimension measured in the radial direction of the respective ball housing. This radial dimension (where, with radial dimension is intended the dimension in a radial direction with reference to the coupling axis X) will be particularly comprised between said inner aperture and said outer aperture.

The plurality of locking balls may be replaced with a plurality of other locking elements, particularly a plurality of other rolling elements, such as rollers. The housing may comprise, in this case, instead of the ball housings, a housing suitable to accommodate other locking elements (rolling elements, such as rollers).

Each locking element (ball) may be movable in the radial direction with the possibility of adopting at least one inner position, in which it partially projects inwards past the inner aperture, and an outer position, in which it partially projects outwards past the outer aperture. The width (diameter) of the inner aperture will be less than the diameter of a locking element (ball) such that the latter can be still stably accommodated within the ball housing thereof, when the element (ball) is in the inner position.

The male portion 7 may particularly have a second inner surface (for example, a surface of revolution, particularly cylindrical) and a second outer surface (for example, a surface of revolution, particularly cylindrical). The second inner surface defines the fluid passage within the second body 5. The second outer surface may be particularly coupled to the first inner surface of the first body 2 (for example, by means of shape coupling, particularly rotoidally), such that the second body 5 is connected within the first body 2 about the coupling axis X.

The second outer surface may have an outer (continuous) groove that may be particularly extended along a circumference that (co-axially) develops about the coupling axis X in order to receive the locking device 8 in the interference locking inner position.

The connector 1 comprises a tubular element 9 (for example, a ring nut or the like) which may be co-axially coupled outside the female portion 4. The tubular element 9 may particularly have a (tubular) locking portion 10 and a (tubular) unlocking portion 11. The locking portion 10 may have, for example, a minimum inner diameter that may be less than a minimum inner diameter of the unlocking portion 11. The tubular element 9 may be axially movable relative to the first body 2 with the possibility of adopting a closed position and an open position. In the closed position (illustrated in the annexed figures) the locking portion 10 (which is narrower, i.e. with a lower inner diameter) externally surrounds the housing to fasten the locking device 8 in the interference locking inner position. In the open position (not illustrated, moved to the left in the annexed figures) the unlocking portion 11 (wider, i.e. with a greater inner diameter) at least partially externally surrounds the housing to allow the locking device to adopt the outer position.

In the closed position of the tubular element 9, the second body 5 may adopt an attachment configuration in which the second body 5 is axially locked relative to the first body 2 because of the interference of portions of the locking device 8 projecting past the inner aperture. In the open position, the second body 5 will be free to axially slide relative to the first body 2 in order to allow the second body 5 to be engaged and/or disengaged.

The first body 2 may have, in particular a first sealing portion that has an outer sealing surface being provided with an annular seal 12 that, in the open position and/or closed position thereof, may be sealingly coupled to an inner surface of an end portion of the tubular element 9.

Particularly, the second body 5 may have a second sealing portion that may be arranged outside the female portion 4 of the first body 2 and that may have a sealing outer surface provided with an annular seal 13 that, in the attachment configuration, may be coupled to an end portion of the tubular element 9. Particularly, the annular seal 13 may be coupled to an inner surface of the unlocking portion 11.

The tubular element 9 (ring nut) may be mounted to the first body 2, for example through a locking member 14 (particularly, a locking ring arranged within an annular housing provided on the first body 2).

The tubular element 9 may be integrally manufactured (as in the specific example herein) as one piece. Particularly, the locking portion 10 and/or the unlocking portion 11 and/or the (sealing) end portion may be integrally manufactured as one piece.

The first body 2 may be integrally manufactured as one piece. Particularly, the first end portion 3 and/or the female portion 4 and/or the first sealing portion may be integrally manufactured as one piece.

The second body 5 may be integrally manufactured as one piece. Particularly the second end portion 6 and/or the male portion 7 and/or the second sealing portion may be integrally manufactured as one piece.

The connector 1 may be structured such that, in the attachment configuration, the second body 5 (having the hose-holding end) is capable of performing a rotation about the coupling axis X relative to the first body 2, while being rotatably supported by the revolving elements (locking balls) coupled (directly in contact) with the circumferential groove arranged on the second body 5.

The detailed description of the patent publication No. WO 2014/108760 A1 is incorporated by reference in the present detailed description.

Figure 2:
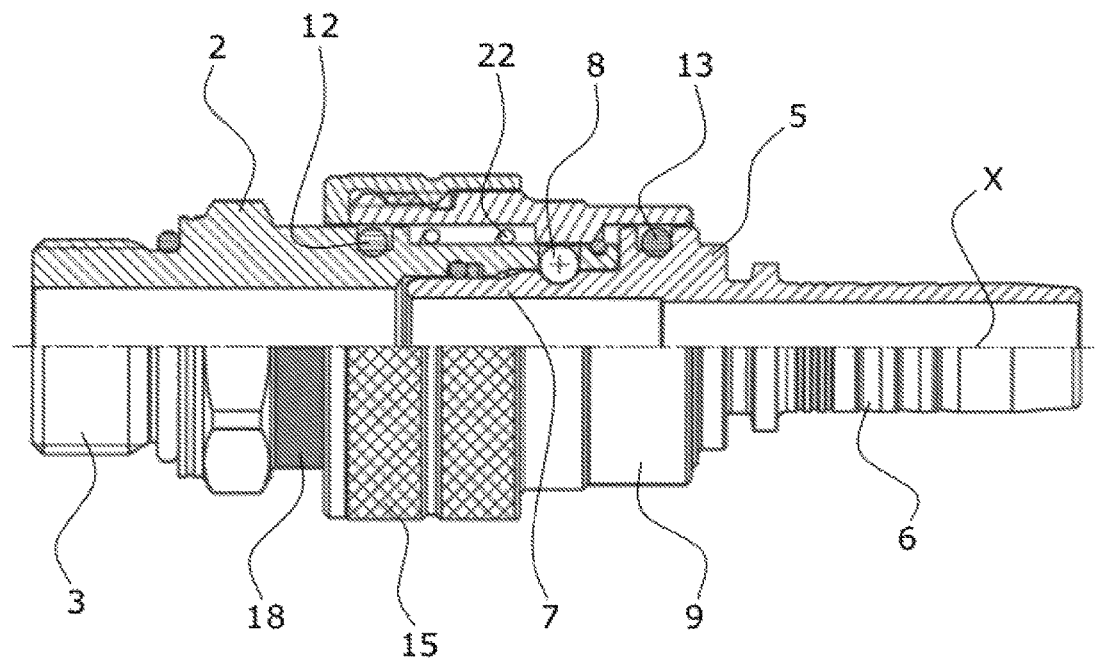
FIG. 2 shows the connector in FIG. 1 in a detachment configuration in which quick attachment/detachment of the connector can be carried out.
Figure 3:
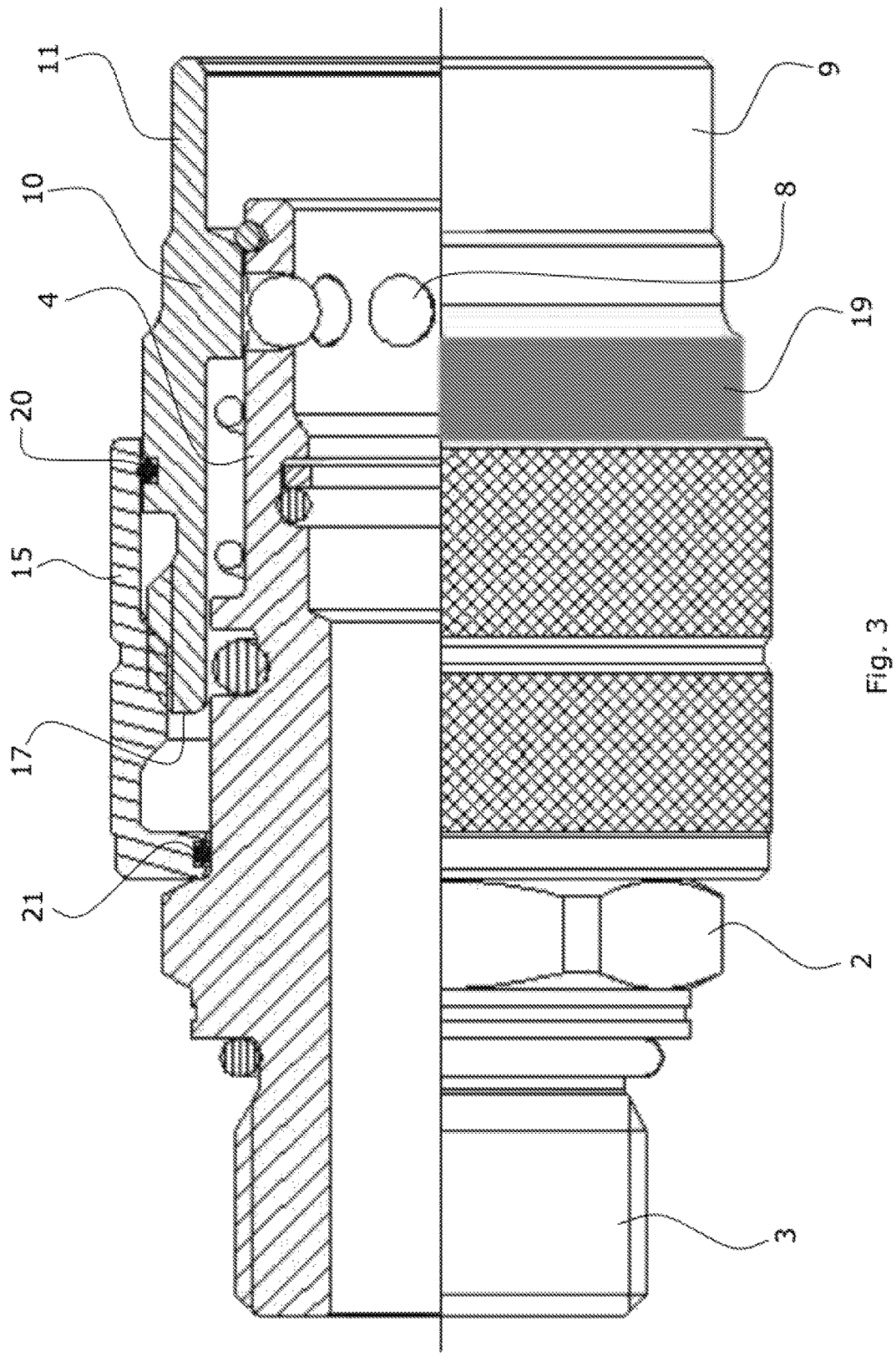
FIG. 3 shows a (female) portion of the connector in FIG. 1 having the safety device in the safety configuration.
Figure 4:
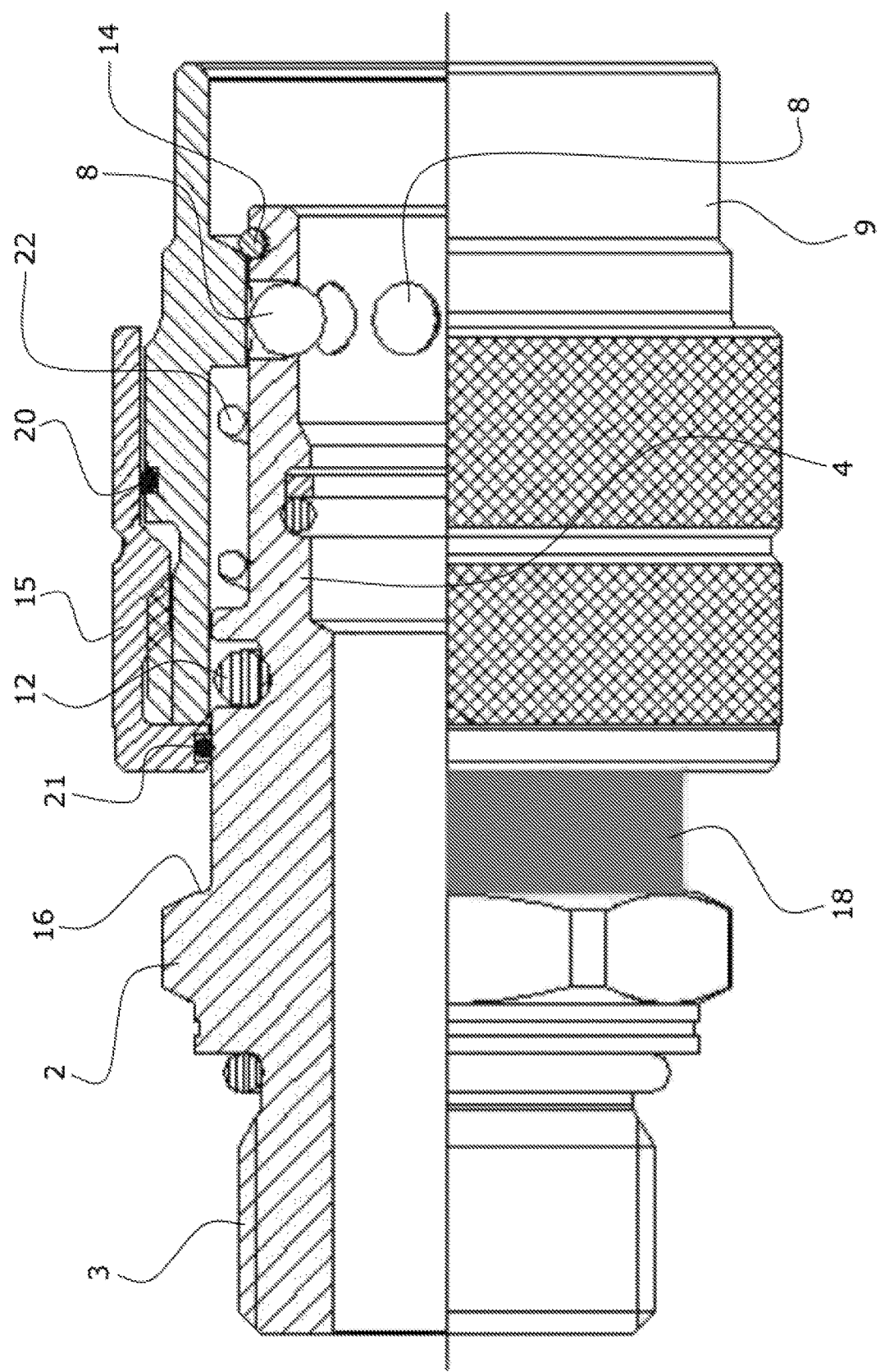
FIG. 4 shows the safety device in FIG. 3 in the freedom configuration in which quick attachment/detachment of the connector can be carried out.

The connector 1 may particularly comprise at least one safety member 15 which is movable relative to the tubular element 9 between at least one safety position (FIGS. 1 and 3), in which the safety member 15 is proximate to at least one abutment 16 (shoulder) arranged on the first body 2 to prevent the tubular element 9 from moving to the open position, and a freedom position (FIGS. 2 and 4), in which the safety member 15 is away from said abutment 16 to allow the tubular element 9 to move to the open position.

The safety member 15 may particularly comprise a tubular body at least partially arranged about the first body 2 and tubular element 9. The safety member 15 may particularly axially slide on the tubular element 9. The safety member 15 may be particularly coupled to the tubular element 9, for example coupled by means of a screw coupling, as in this case.

The tubular element 9 may have, for example, at least one further abutment 17 to provide an end stop of the safety member 15 in the freedom position.

The connector 1 may comprise, as in this example, a first signaling member 18, for example a first coloured surface, particularly coloured in red, which is visible when the safety member 15 is in the freedom position (FIGS. 2 and 4) and covered by the safety member 15 when it is in the safety position. The first signaling member 18 may comprise a (cylindrical) surface of revolution, as in this example. The first signaling member 18 may be particularly arranged either on the first body 2 (as in this example) or on the second body 5.

The connector 1 may particularly comprise second signaling member 19, for example a second coloured surface, particularly coloured in green, which is visible when the safety member 15 is in the safety position (FIGS. 1 and 3) and covered by the safety member 15 when it is in the freedom position. The second signaling member 19 may comprise a (cylindrical) surface of revolution, as in this example. The second signaling member 19 may be, for example, arranged on the tubular element 9.

The connector 1 may comprise, as in this example, a first sealing element 20 arranged between the safety member 15 and the tubular element 9 to prevent dirt from entering from outside a coupling area in which the safety member 15 is coupled to the tubular element 9.

The connector 1 may comprise, as in this example, second sealing element 21 arranged between the safety member 15 and the first body 2 to prevent dirt from entering from outside the coupling area where the safety member 15 is coupled to the tubular element 9.

The safety member 15 may have, as in this case, an outer gripping (for example, corrugated) surface which is free to be gripped by an external gripping tool (for example, an operator's hand) to (axially) move the safety member 15 between the safety position and the freedom position, for example by screwing or unscrewing the safety member 15 relative to the tubular element 9.

When the safety member 15 is in the freedom position, the outer gripping surface at least partially surrounds the tubular element 9 and can be gripped by the external gripping tool (the operator's hand) in order to move the tubular element 9 from the closed position to the open position (by pushing or pulling in either direction). It is possible, as in this case, to arrange an elastic element 22 to push the tubular element 9 towards the closed position.

The safety member 15 may be particularly integrally manufactured as one piece.

In use, the connector 1 may adopt an operating configuration (FIGS. 1 and 3), wherein the second body 5 (to which a hose, not illustrated, can be mounted) and the first body 2 (which can be connected to a hydraulic use, not illustrated) are inserted within each other and maintained axially coupled by a locking device 8 (revolving elements) which prevents removal (they may allow mutual rotation about the coupling axis X). The safety member 15 should be in the safety position, in which it is proximate (for example, in contact with) the abutment 16 (shoulder) on the first body 2. In this position, the tubular element 9 cannot be moved, not even accidentally, to the open position, but remains fastened and secured in the closed position, whereby the locking device 8 maintains the interference with the second body 5 ensuring connection.

The connector 1 may be disconnected by moving the safety member 15 to the freedom position, in which it is away from the abutment 16. In this position, the tubular element 9 can be moved to the open position (moved to the left, with reference to the annexed figures) such as to release the locking device 8 that will be able to radially move to the outside where they do not interfere anymore with the second body 5 that can be axially removed.

A new connection can be carried out by first bringing the safety member 15 to the freedom position (by screwing the member 15 on the tubular element 9) and then moving the locking tubular element 9 to the open position (for example, by holding the gripping surface on the safety member 15 and pulling with one hand), such that the second body 5 can be inserted into the first body 2 (for example, with the other hand). The tubular locking element 9 is then released, whereby the elastic element 22 can automatically bring the latter in the closed position. At this stage, the operator can move the safety member 15 into the safety position (by unscrewing the safety member 15 from the tubular element 9 by means of rotation about the screw coupling axis), thereby returning to the initial operating configuration. If the operator sees the first signaling member 18 (red-coloured surface), he/she will understand that the connector 1 is not in the safety condition (because the safety member 15 is not in a safety position) and will be thus induced to move the safety member 15, on the other hand, if he/she sees the second signaling member 19 (green-coloured surface) he/she will have a confirmation that the connector 1 is in the safety condition.

The invention claimed is:

1. A connector, comprising:
a first tubular body defining a fluid passage;
a second tubular body defining a fluid passage and being axially removably coupled to said first body in a fluid-tight manner such as to define one individual fluid passage;
a removable locking device arranged to lock a relative axial movement between said first body and said second body;
a tubular element axially movable relative to said first body and said second body with the possibility of adopting a closed position, in which it fastens said locking device to lock said relative axial movement and an open position, in which it releases said locking device to enable said relative axial movement; and
at least one safety member movable relative to said tubular element between at least one safety position, in which it is proximate to at least one abutment arranged on said first body to prevent said tubular element to move to said open position, and a freedom position, in which it is away from said at least one abutment to allow said tubular element to move to said open position, said at least one safety member comprising a tubular body coupled to said tubular element by means of a screw coupling.

2. The connector according to claim 1, wherein said at least one safety member is slidably coupled to said tubular element.

3. The connector according to claim 1, wherein said at least one safety member is fastened in contact with said tubular element both in said safety position and in said freedom position.

4. The connector according to claim 1, wherein said tubular element has at least one further abutment to provide an end stop for said safety member in said freedom position.

5. The connector according to claim 1, comprising a first signaling member, which is visible when said safety member is in said freedom position and covered by said safety member when it is in said safety position.

6. The connector according to claim 1, comprising a second signaling member, which is visible when said safety member is in said safety position and covered by said safety member when it is in said freedom position.

7. The connector according to claim 1, comprising a first sealing element arranged between said at least one safety member and said tubular element to prevent dirt from entering from outside a coupling area in which said at least one safety member is coupled to said tubular element.

8. The connector according to claim 1, comprising a second sealing element arranged between said at least one safety member and said first body to prevent dirt from entering from outside a coupling area in which said at least one safety member is coupled to said first body.

9. The connector according to claim 1, wherein said at least one safety member has an outer gripping surface which is free to be gripped by an external gripping tool to move the safety member between said safety position and said freedom position.

10. The connector according to claim 9, wherein, when said at least one safety member is in said freedom position, said outer gripping surface at least partially surrounds said tubular element and can be gripped by the external gripping tool to move said tubular element from said closed position to said open position, an elastic element being arranged to push said tubular element to said closed position.

11. The connector according to claim 1, wherein said first body is a female body and said second body is a male body.

12. The connector according to claim 1, wherein said first body is provided with an end for connection with a hydraulic use and/or wherein said second body is provided with an end for connection with a hydraulic conveyor hose.

13. The connector according to claim 1, wherein:
said first body is entirely of the free flowing type whereby it defines a fluid passage therein, which is not provided with intercepting members or other valve elements;
said second body is entirely of the free flowing type whereby it defines a fluid passage therein, which is not provided with intercepting members or other valve elements;
each of said tubular element, first body, second body and safety member is integrally provided in one piece.

14. The connector according to claim 1, wherein:
said first body has a tubular female portion having a first inner surface and a first outer surface, said female portion having a housing arranged along a circumference about a coupling axis between said first and second bodies, said housing having at least one inner aperture on said first inner surface and at least one outer aperture on said first outer surface;
said locking device comprises a plurality of revolving bodies arranged in said housing, each revolving body having a radial dimension greater than a radial dimension of said housing comprised between said inner aperture and said outer aperture, each revolving body being movable in radial direction with the possibility of adopting at least one inner position of interference locking in which it partially projects inwards past said inner aperture and an outer position wherein it partially projects outwards past said outer aperture;
said second body has a tubular male portion inserted in said female portion according to said coupling axis, said male portion having a second inner surface and a second outer surface, said second inner surface defining the fluid passage, said second outer surface being coupled to said first inner surface, said second outer surface having an outer groove extended along a circumference about said coupling axis to receive said revolving bodies in the at least one inner position;
said tubular element is co-axially coupled outside said female portion, said tubular element having a tubular locking portion and a tubular unlocking portion, said locking portion having a minimum inner diameter lesser than a minimum inner diameter of said unlocking portion, in said closed position said locking portion externally surrounding said housing to fasten said revolving bodies in said at least one inner position, in said open position said unlocking portion externally surrounding said housing to allow said revolving bodies to adopt said outer position, whereby in said closed position said second body is locked in axial direction relative to said first body by the interference of the projecting revolving bodies past said inner aperture, and in said open position said second body is free to axially slide relative to said first body.

15. A connector, comprising:
a first tubular body defining a fluid passage;
a second tubular body defining a fluid passage and being axially removably coupled to said first body in a fluid-tight manner such as to define one individual fluid passage;
a removable locking device arranged to lock a relative axial movement between said first body and said second body;
a tubular element axially movable relative to said first body and said second body with the possibility of adopting a closed position, in which it fastens said locking device to lock said relative axial movement and an open position, in which it releases said locking device to enable said relative axial movement;
at least one safety member movable relative to said tubular element between at least one safety position, in which it is proximate to at least one abutment arranged on said first body to prevent said tubular element to move to said open position, and a freedom position, in which it is away from said at least one abutment to allow said tubular element to move to said open position; and
a first sealing element arranged between said at least one safety member and said tubular element to prevent dirt from entering from outside a coupling area in which said at least one safety member is coupled to said tubular element.

16. The connector according to claim 15, wherein said at least one safety member is fastened in contact with said tubular element both in said safety position and in said freedom position.

17. The connector according to claim 15, comprising a second sealing element arranged between said at least one safety member and said first body to prevent dirt from entering from outside a coupling area in which said at least one safety member is coupled to said first body.

18. A connector, comprising:
a first tubular body defining a fluid passage;
a second tubular body defining a fluid passage and being axially removably coupled to said first body in a fluid-tight manner such as to define one individual fluid passage;

a removable locking device arranged to lock a relative axial movement between said first body and said second body;

a tubular element axially movable relative to said first body and said second body with the possibility of adopting a closed position, in which it fastens said locking device to lock said relative axial movement and an open position, in which it releases said locking device to enable said relative axial movement;

at least one safety member movable relative to said tubular element between at least one safety position, in which it is proximate to at least one abutment arranged on said first body to prevent said tubular element to move to said open position, and a freedom position, in which it is away from said at least one abutment to allow said tubular element to move to said open position; and a sealing element arranged between said at least one safety member and said first body to prevent dirt from entering from outside a coupling area in which said at least one safety member is coupled to said first body.

19. The connector according to claim 18, wherein said at least one safety member is fastened in contact with said tubular element both in said safety position and in said freedom position.

20. The connector according to claim 18, comprising a further sealing element arranged between said at least one safety member and said tubular element to prevent dirt from entering from outside a coupling area in which said at least one safety member is coupled to said tubular element.

\* \* \* \* \*